United States Patent [19]

Katsumori et al.

[11] 4,411,342

[45] Oct. 25, 1983

[54] HYDRAULIC DAMPER

[75] Inventors: Teiji Katsumori; Tetuo Kato; Miura Ieaki, all of Yokohama, Japan

[73] Assignee: Tokico Ltd., Kanagawa, Japan

[21] Appl. No.: 343,335

[22] Filed: Jan. 27, 1982

Related U.S. Application Data

[63] Continuation of Ser. No. 124,238, Feb. 25, 1980, abandoned.

[30] Foreign Application Priority Data

Feb. 23, 1979 [JP] Japan .................................. 54-20349

[51] Int. Cl.³ .............................................. F16F 9/36
[52] U.S. Cl. ................................. 188/315; 188/322.17; 267/126
[58] Field of Search .................... 188/315, 318, 322.17, 188/322.21, 322.13; 267/129, 64.15, 64.28, 126; 92/86; 137/853; 277/29; 222/402.16

[56] References Cited

U.S. PATENT DOCUMENTS

| | | | |
|---|---|---|---|
| 3,203,511 | 8/1965 | Long | 188/315 |
| 4,005,769 | 2/1977 | Itoh | 188/315 |
| 4,108,287 | 8/1978 | Kato | 188/318 |
| 4,185,721 | 1/1980 | Karklins et al. | 188/315 |
| 4,189,033 | 2/1980 | Katsumori | 188/315 |
| 4,245,825 | 1/1981 | Ohtomo et al. | 188/315 |
| 4,274,517 | 6/1981 | Kato et al. | 188/315 |

*Primary Examiner*—Robert J. Spar
*Assistant Examiner*—R. R. Diefendorf
*Attorney, Agent, or Firm*—Wenderoth, Lind & Ponack

[57] ABSTRACT

A hydraulic damper includes a dual-tube type housing consisting of inner and outer tubes, a piston slidably disposed in the inner tube and dividing the interior thereof into two oil chambers, a piston rod secured to the piston and extending to the outside of the housing, a reservoir chamber defined between the inner and outer tubes and containing therein oil and gas, a passage connecting one of the oil chambers through which the piston rod extends with the gas containing portion of the reservoir chamber, and a valve member formed of a resilient material and having a lip portion acting as one-way valve for allowing fluid flow in the passage only in the direction from the one oil chamber to the reservoir chamber. A substantial portion of the radially inner surface of the lip portion is supported by a rigid annular retaining member.

6 Claims, 2 Drawing Figures

HYDRAULIC DAMPER

This is a continuation of Ser. No. 124,238, filed Feb. 25, 1980, now abandoned.

BACKGROUND OF THE INVENTION

This invention relates to hydraulic dampers for use in systems such as vehicle suspension systems or the like and, particularly, to hydraulic dampers of the kind including a dual tube type housing consisting of inner and outer tubes, a piston slidably disposed in the inner tube and dividing the interior thereof into two oil chambers, a piston rod secured to the piston and extending to the outside of the housing, a reservoir chamber defined between the inner and outer tubes and containing therein oil and gas, a passage connecting one of the oil chambers through which the piston rod extends with the gas containing portion of the reservoir chamber, and a valve member formed of a resilient material and having a lip portion acting as a one-way valve for allowing fluid flow in the passage only in the direction from the one oil chamber to the gas containing portion of the reservoir chamber.

In mounting the hydraulic damper on a vehicle or in operating the damper, gas will sometimes be contained or accumulated in the oil chambers according to the so-called aeration phenomenon or the like. When the oil chambers are not completely filled with oil the operating characteristics of the damper are substantially impaired. The one-way valve effectively returns any gas contained in the oil chambers to the reservoir chamber and maintains the desired characteristics of the damper and, usually, the valve opens in the extension stroke of the damper whereby the pressure in the one oil chamber through which the piston rod extends will increase with respect to the gas pressure in the reservoir chamber and closes in the contraction stroke of the damper whereby the pressure in the one oil chamber decreases with respect to the gas pressure.

The lip portion of the valve member of the one-way valve which engages with or separates from a cooperating valve seat during closing or opening the valve must have sufficient flexibility so as to open the valve easily and quickly and, also, must have sufficient stiffness so as to withstand the gas pressure in the reservoir chamber in the valve closed condition. However, it has been difficult to satisfy these contrary requirements and various proposals have been made with respect to the material, hardness, or thickness of the valve member and to the design and construction of the valve. For example, when the base portion of the lip portion is made of soft material or is formed to have a thin thickness so as to easily open the valve, the lip portion will deform excessively in the valve closed condition. When the stiffness of the base portion is increased the valve will not open easily.

SUMMARY OF THE INVENTION

The present invention solves the problems aforementioned and, according to the invention, the lip portion of the valve member extends generally in the direction of the axis of the damper, and the displacement of the base portion of the lip portion in a direction radially inwardly with respect to the axis of the damper is prevented by a rigid retaining member.

Preferably, the retaining member is formed of a rigid material such as metal, synthetic resin or the like and includes a cylindrical portion engaging with the radially inner surface of the lip portion and a flange portion integrally formed with and extending radially outwards from one end of the cylindrical portion.

BRIEF DESCRIPTION OF THE DRAWINGS

For a better understanding of the invention, reference will now be made to the accompanying drawings, in which.

DETAILED DESCRIPTION OF THE PREFERRED EMBODIMENTS

Figure 1:
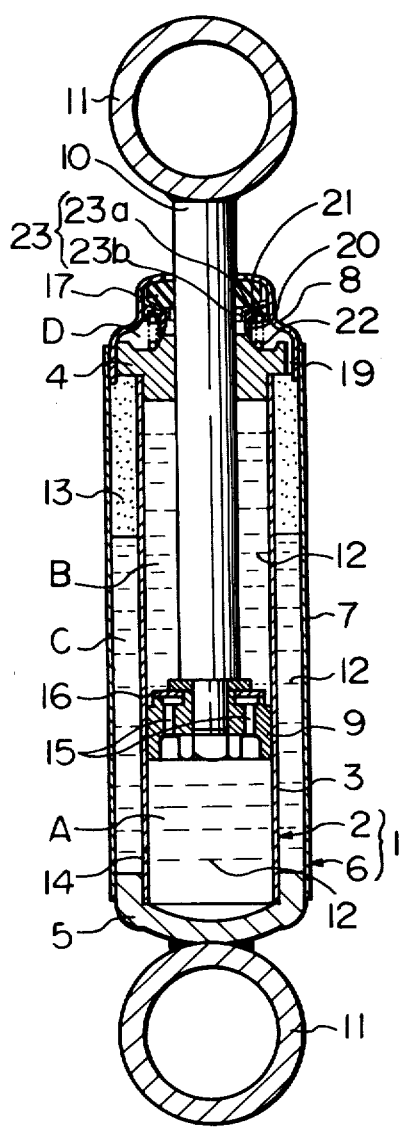
FIG. 1 is a longitudinal sectional view of a hydraulic damper according to the invention.

The hydraulic damper illustrated in the drawings comprises a dual-tube type housing 1 consisting of an inner tube 2 and outer tube 6. The inner tube 2 is formed of a tubular body 3 with the upper and lower ends thereof being closed respectively by a rod guide 4 and a bottom flange 5. The outer tube 6 is formed of a tubular body 7 with the upper and lower ends thereof being closed respectively by an end cover 8 and the bottom flange 5. The rod guide 4 and the bottom flange 5 cooperate to locate the inner tube 2 coaxially with respect to the outer tube 6. A piston 9 is slidably disposed in the inner tube 2 and divides the interior of the inner tube 2 into two oil chambers A and B. A piston rod 10 secured to the piston 9 extends through the oil chamber B, slidably through the rod guide 4 and through the end cover 8 to the outside of the housing 1. Mounting rings 11 are secured respectively to the end flange 5 and to the outer end of the piston rod 10 for mounting the hydraulic damper between sprung and unsprung masses of a vehicle.

The oil chambers A and B are filled with oil 12, and a reservoir chamber C defined between the inner and outer tubes 2 and 6 is filled with oil 12 and pressurized gas 13. The lower end portion of the reservoir chamber C is connected with the oil chamber A through an opening 14 having a throttling function. A damping force generating mechanism known per se is provided in the piston 9. In the illustrated embodiment, the mechanism includes a plurality of passages 15 formed axially through the piston 9 to connect the chambers A and B, and a resilient valve disc 16.

Figure 2:
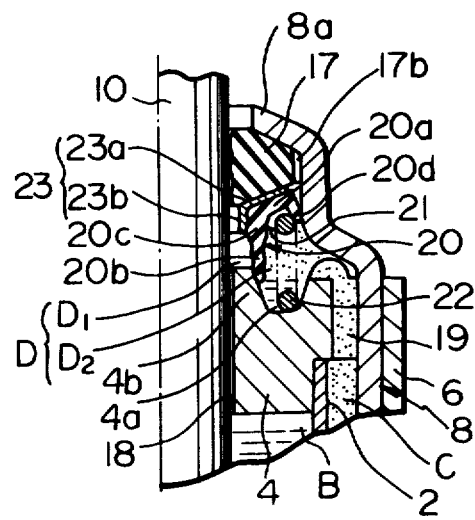
FIG. 2 is an enlarged view of the essential portion of FIG. 1.

As shown clearly in FIG. 2, a seal member 17 is fitted in the inner periphery of the end cover 8 to seal the interior of the housing 1 from the outside of the damper. An annular valve chamber D is defined between the seal member 17 and the rod guide 4. The valve chamber D is communicated with the oil chamber B through a small clearance 18 defined between the piston rod 10 and the rod guide 4 and, also, with the gas receiving portion or the upper end portion of the reservoir chamber C through at least one passage 19 which is defined by an axially extending groove or slot formed in the outer peripheral portion of the rod guide 4. The clearance 18, the valve chamber D and the passage 19 constitute a passage connecting the chambers B and C according to the invention.

Disposed in the valve chamber D is a valve member 20 formed of a resilient material such as rubber or the like. The valve member 20 has an annular flange portion 20a which extends generally in the radial direction with respect to the axis of the damper, and a cylindrical lip portion 20b integrally connected to the flange portion 20a and extending generally in the direction of the axis of the damper. The valve member 20 is urged toward the lower surface of the seal member 17, with a first retaining member 23 therebetween according to the invention, by a spring 22 which acts between the bottom wall of an annular recess 4a formed in the upper surface of the rod guide 4 and a spring retainer 21 provided on the lower surface of the valve member 20 and retained between a base portion 20c and a radially outwardly positioned generally axially extending cylindrical portion 20d, to be discussed in more detail below. Second retainer 21 has a generally radially extending flange portion abutting with an axially inner surface of resilient member 20, and an integral axially extending cylindrical portion having a radially inner surface in engagement with a radially outer peripheral surface of said base portion.

The radially inner side wall of the annular recess 4a defines a valve seat 4b with respect to which the lip portion 20b of the valve member 20 engages or separates therefrom. When the lip portion 20b engages with the valve seat 4b, the valve chamber D is divided into an inner chamber $D_1$ with which the oil chamber B communicates and an outer chamber $D_2$ with which the reservoir chamber C communicates. When the lip portion 20b separates from the valve seat 4b, the chambers $D_1$ and $D_2$ are communicated.

The movement of the lip portion 20b with respect to the valve seat 4b to engage therewith or separate therefrom involves a rocking movement of the lip portion 20b in a direction radially outwards with respect to the axis of the damper and around the base portion 20c thereof which is defined as a portion connecting the lip portion 20b with the flange portion 20a.

The retaining member 23 is formed of a rigid material such as metal, synthetic resin or the like and engages with the upper surface of and a substantial part of the radially inner surface of the valve member 20. The retaining member 23 has a radially extending flange portion 23a and an axially extending cylindrical portion 23b. The cylindrical portion 23b supports the base portion 20c of the valve member 20, thus preventing excessive deformation of the lip portion which would be caused by the gas pressure in the reservoir chamber C. The valve member 20 may be secured integrally to the retaining member by baking or by bonding agents or the like but, preferably, the valve member 20 simply abuts with the retaining member 23 whereby the movement of the lip portion 20b in the radially outward direction can easily be effected in opening the valve. The flange portion 23a and the lower surface of the seal member 17 against which the flange portion 23a engages are inclined upwards in the radially outward direction so that the retaining member 23 and the valve member 20 can reliably be aligned with respect to the axis of the damper.

The valve member 20 has another lip portion in the form of generally axially extending cylindrical portion 20d on the outer circumference of the flange portion 20a for engaging with the inner surface of the end cover 8 thereby enhancing the capability of the housing 1. The lip portion 20d can act as a check valve in filling pressurized gas into the reservoir chamber C. For performing easily the gas filling operation, there is formed at least one cut-out portion 17b in the outer circumference of the seal member 17. In filling gas into the reservoir chamber C the seal member 17 is displaced downwards to communicate the cut-out portion 17b with the outside, and pressurized gas is supplied from the outside. The lip portion 20d deflects radially inwards and separates from the end cover 8. Thereafter, the pressing force applied on the seal member 17 is released, and due to the resilient force of the lip portion 20d and to the spring force of the spring 22, the lip portion 20d engages with the inner surface of the end cover 8 to isolate the reservoir chamber C from the outside.

The operation of the hydraulic damper having the construction as heretofore described will now be explained briefly. When the piston rod 10 is pressed inwardly or downwards in the drawing, oil 12 in the oil chamber A is compressed by the piston 9 which is secured to the piston rod 10. The outer peripheral portion of the valve disc 16 is deflected upwards, and the oil in the chamber A flows into the chamber B generating a damping force. The oil in the chamber A also flows into the reservoir chamber C through the opening 14. The volume of the gas 13 in the reservoir chamber C decreases by an amount corresponding to the ingress of the piston rod 10 into the inner tube 2. The pressure of the gas in the reservoir chamber C acts on the outer circumference of the lip portion 20b to maintain it in the closed condition, but excessive deformation of the lip portion 20b in the radially inward direction is prevented by the retaining member 23 which abuts with the base portion 20c and receives a part of the force of gas pressure acting on the lip portion 20b in the radially inward direction.

When the piston rod 10 moves in the extending direction or upwards in the drawing, the oil 12 in the oil chamber B is compressed. The inner peripheral portion of the valve disc 16 is deflected downwardly, and the oil in the chamber B flows into the chamber A generating a damping force. Any gas which would be contained in the chamber B due to the aeration phenomenon or the like will pass through the clearance 18 and flow into the inner chamber $D_1$ and, in the extending stroke of the piston, deflects outwardly the lip portion 20b of the valve member 20 and flows into the outer chamber $D_2$. The gas in the oil chamber B can reliably be returned to the reservoir chamber C.

In the illustrated embodiment, the damping force generating mechanism mounted on the piston 9 acts in the extension and contraction strokes of the damper. However, a damping force generating mechanism effecting in the contraction stroke may be mounted in the bottom portions of chambers A and C, with the damping force generating mechanism mounted on the piston 9 being effective only in the extension stroke of the damper.

As described heretofore, the deformation or displacement of the lip portion of the valve member in the valve closed condition due to the pressure of the gas in the reservoir chamber can reliably be prevented and, the valve member can be formed to operate satisfactorily such that the one way valve can open quickly and easily as desired and maintain reliably the closed condition when any gas is not contained in the oil chamber B. Thus the operating characteristics of the damper can be improved.

What is claimed is:

1. A hydraulic damper comprising:
 a dual-tube type housing including inner and outer tubes defining therebetween a reservoir chamber;
 a piston slidably mounted within said inner tube and dividing the interior thereof into first and second liquid chambers;

liquid filling said first and second liquid chambers and a portion of said reservoir chamber adjacent said second liquid chamber, and gas filling a portion of said reservoir chamber adjacent said first liquid chamber;

a piston rod secured to said piston and extending through said first liquid chamber to the exterior of said housing;

passage means for connecting said first liquid chamber to said gas filled portion of said reservoir chamber;

a seal member fixedly supported on said housing and sealing said first liquid chamber and said gas filled portion of said reservoir chamber from the exterior, said piston rod sealingly slidably extending through said seal member;

a rod guide secured to said inner tube for guiding the sliding movement of said piston rod, said passage means including a clearance between said rod guide and said piston rod;

a cover secured to said outer tube and retaining said seal member;

means positioned in said passage means, for allowing fluid flow only from said first liquid chamber to said gas filled portion of said reservoir chamber and for preventing fluid flow in the reverse direction, said means comprising a resilient member having a flange portion, a base portion integral with said flange portion and extending axially therefrom, a lip portion integral with said base portion and extending axially therefrom, said lip portion coacting with a valve seat portion of said rod guide to form a one-way valve for controlling said fluid flow, and a cylindrical portion integral with said flange portion and extending generally axially therefrom at a location radially outwardly spaced from said base portion and said lip portion;

means for radially supporting and retaining said base portion and thereby for preventing excessive radial inward deformation of said lip portion due to pressure from said gas in said gas filled portion of said reservoir chamber, said supporting and retaining means comprising a first rigid annular retainer member including a generally radially extending flange portion positioned between an axially inner surface of said seal member and said flange portion of said resilient member, and an integral axially extending cylindrical portion having a radially outer peripheral surface in engagement with a radially inner peripheral surface of said base portion, and a second annular rigid retainer member including a generally radially extending flange portion abutting with an axially inner surface of said resilient member, and an integral axially extending cylindrical portion having a radially inner surface in engagement with a radially outer peripheral surface of said base portion; and spring means acting between said rod guide and said second rigid annular retaining member for urging said resilient member and said first and second retainer members toward said inner surface of said seal member.

2. A hydraulic damper as claimed in claim 1, wherein said cylindrical portion of said resilient member sealingly engages with the inner surface of said cover.

3. A hydraulic damper as claimed in claim 1, wherein said base portion has a thickness greater than the thickness of said lip portion.

4. A hydraulic damper as claimed in claim 1, wherein said flange portion of said resilient member and said flange portion of said first retainer member extend in axially and radially outwardly inclined directions from said base portion of said resilient member and from said cylindrical portion of said first retainer member, respectively.

5. A hydraulic damper as claimed in claim 2, wherein said retainer members are bonded to said resilient member.

6. A hydraulic damper as claimed in claim 1, wherein said retainer members are in abutting and unattached contact with said resilient member.

* * * * *